United States Patent [19]

Faris

[11] Patent Number: 5,221,982
[45] Date of Patent: Jun. 22, 1993

[54] POLARIZING WAVELENGTH SEPARATOR

[76] Inventor: Sadeg M. Faris, 24 Pocantico River Rd., Pleasantville, N.Y. 10570

[21] Appl. No.: 726,062

[22] Filed: Jul. 5, 1991

[51] Int. Cl.⁵ .............................................. G02F 1/13
[52] U.S. Cl. ........................................ 359/93; 359/48; 359/38; 359/53; 359/73; 359/101; 353/31; 353/82
[58] Field of Search ...................... 359/93, 63, 65, 66, 359/70, 73, 53, 48, 49, 38, 62, 101; 353/31, 34, 82, 84, 122

[56] References Cited

U.S. PATENT DOCUMENTS

| | | | |
|---|---|---|---|
| 4,093,356 | 6/1978 | Bigelow | 359/73 |
| 4,124,278 | 11/1978 | Grinberg et al. | 359/73 |
| 4,387,133 | 6/1983 | Ichikawa et al. | 359/73 X |
| 4,398,805 | 8/1983 | Cole | 359/73 |
| 4,670,744 | 6/1987 | Buzak | 359/73 |
| 4,798,448 | 1/1989 | van Raalte | 359/49 |

*Primary Examiner*—Stanley D. Miller
*Assistant Examiner*—Huy K. Mai

[57] ABSTRACT

A polarizing wavelength separating optical element, PWS, in the form of a flat panel causes each of a plurality of polychromatic optical beams from a source, entering at one surface and transmitted to the other surface, to be converted with high conversion efficiency into beams circularly polarized, spectrally separated and spatially separated. The input optical beams are identical and in the form of a linear periodic array illuminating the PWS element. Output circularly polarized beams are spatially separated by a variable distance and have separated wavelengths that can be in any order: ascending, descending or random. The PWS is made of a periodic array of cells whose period is identical to that of the optical source. Each cell comprises a plurality of subcells. One subcell functions as a broadband reflector, while each of the remaining subcells functions as a polarizing wavelength selective reflector. The number of the latter subcells depends on the number of wavelengths or wavelength bands to be separated. Each subcell in turn comprises a plurality of layers that are bonded together at their surfaces which are oriented at a 45° angle relative to the horizontal surfaces of the PWS panel. In each subcell, the plurality of layers comprise two cholesteric liquid crystal, CLC, films which reflect at a selected wavelength, at least one phase shifting layer (optical retarder), and an appropriate number of clear substrates which provide mechanical supports. The thicknesses of the supporting substrates are designed to cause the optical beams transmitted through the PWS to be spatially separated by appropriate distances. Direct view displays and projection displays are simplified.

17 Claims, 13 Drawing Sheets

FIG. 1a (PRIOR ART)
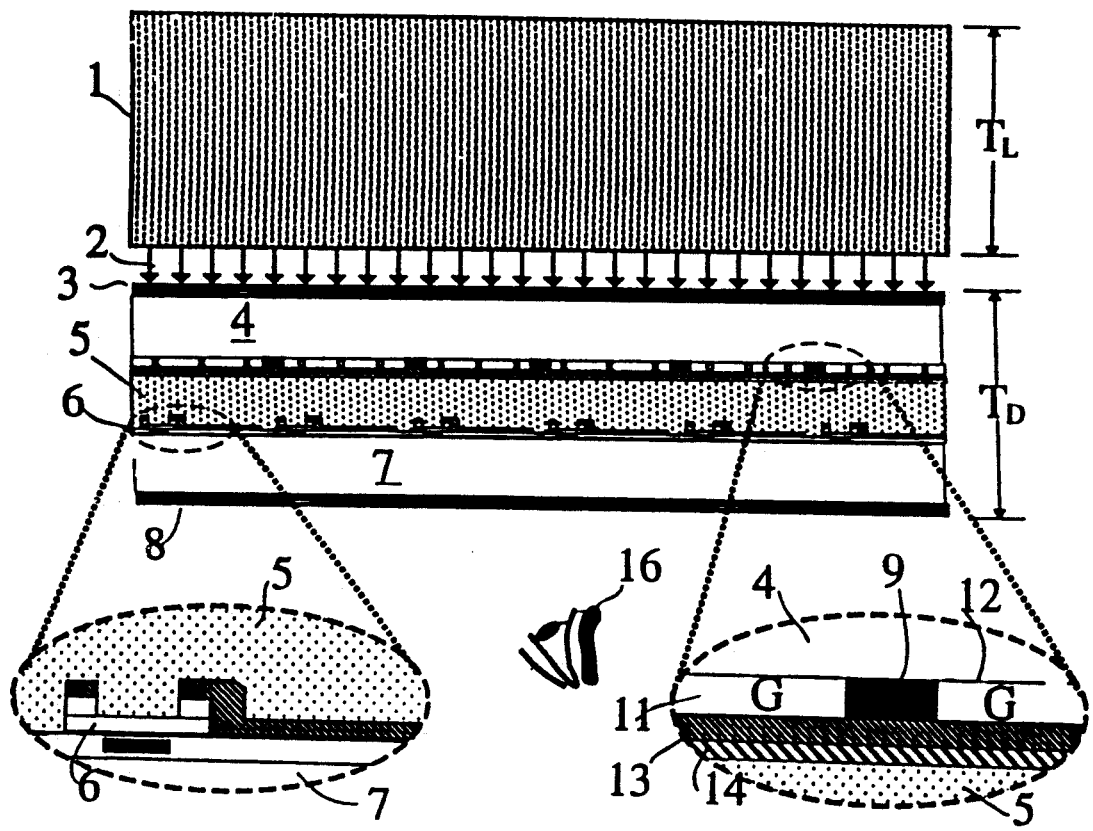
FIG. 1b (PRIOR ART)
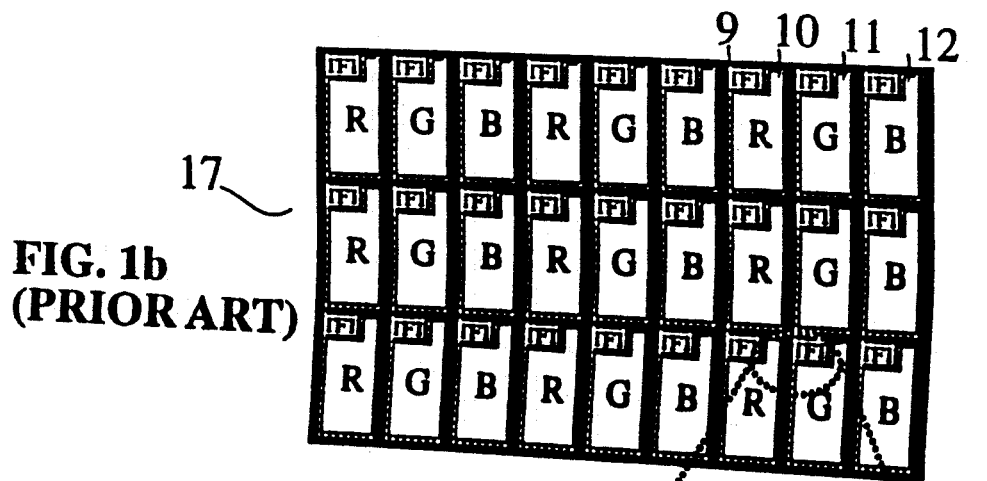
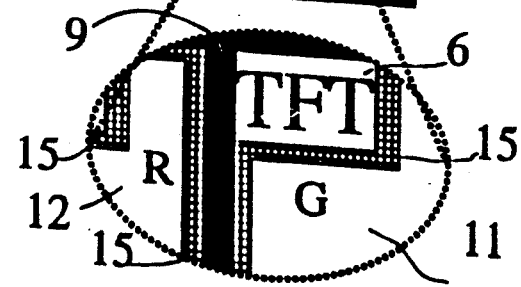

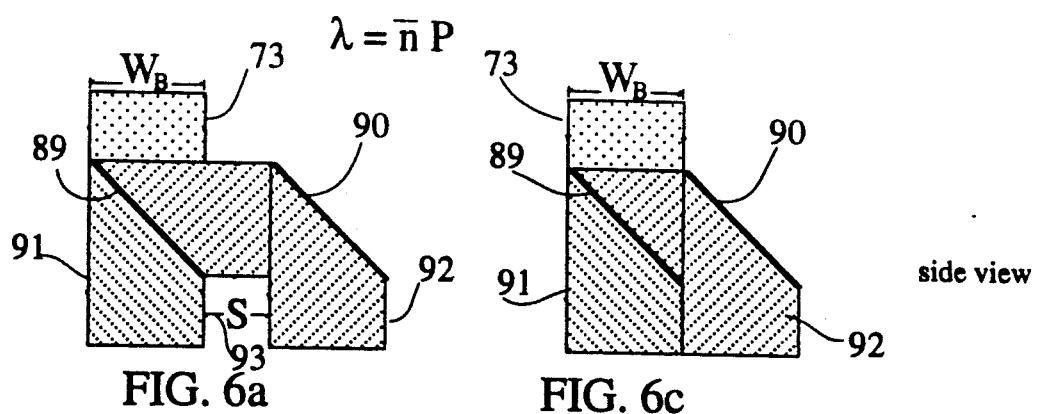
FIG. 6a   FIG. 6c
FIG. 6b   FIG. 6d
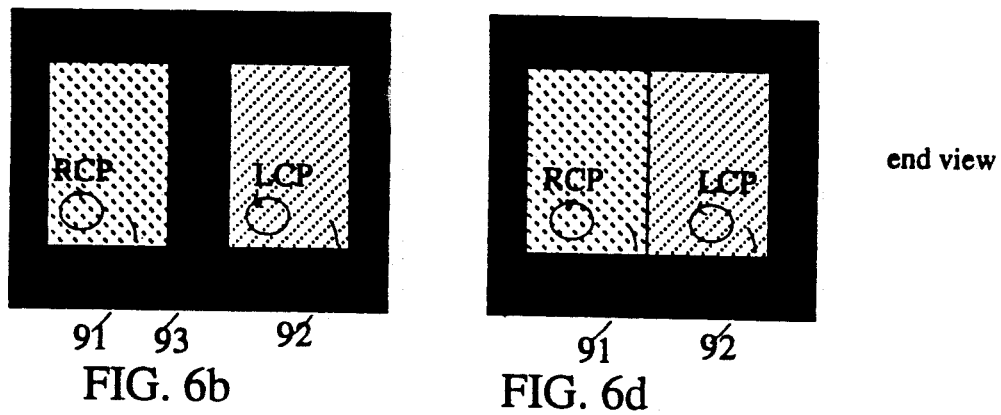
FIG. 6e   FIG. 6g
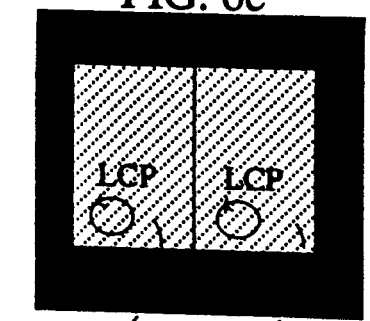
FIG. 6f
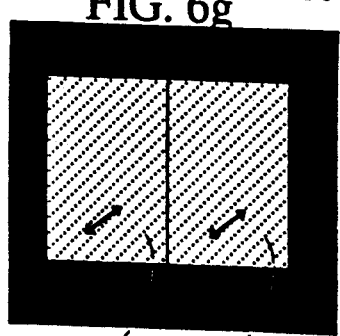
FIG. 6h

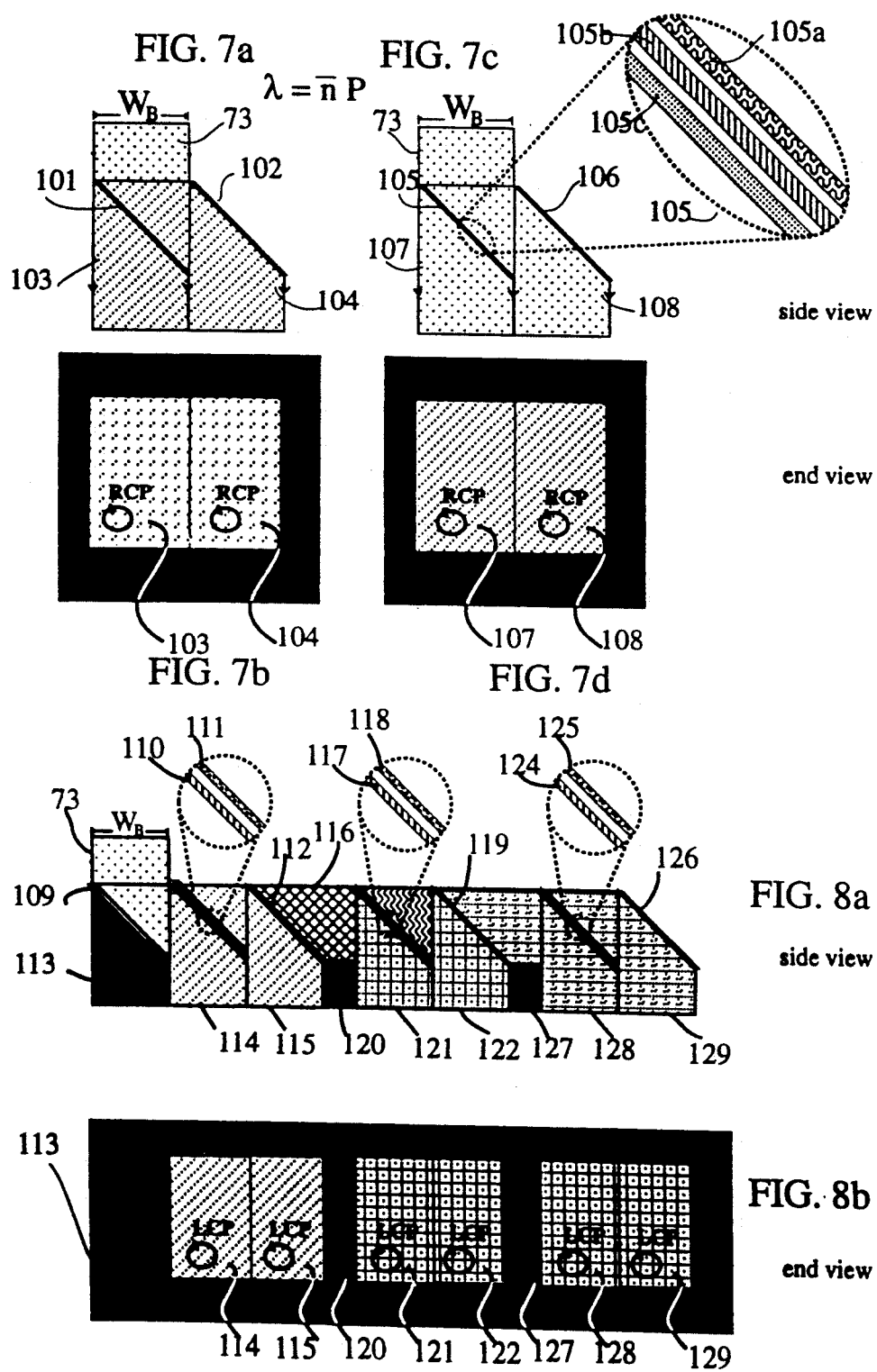

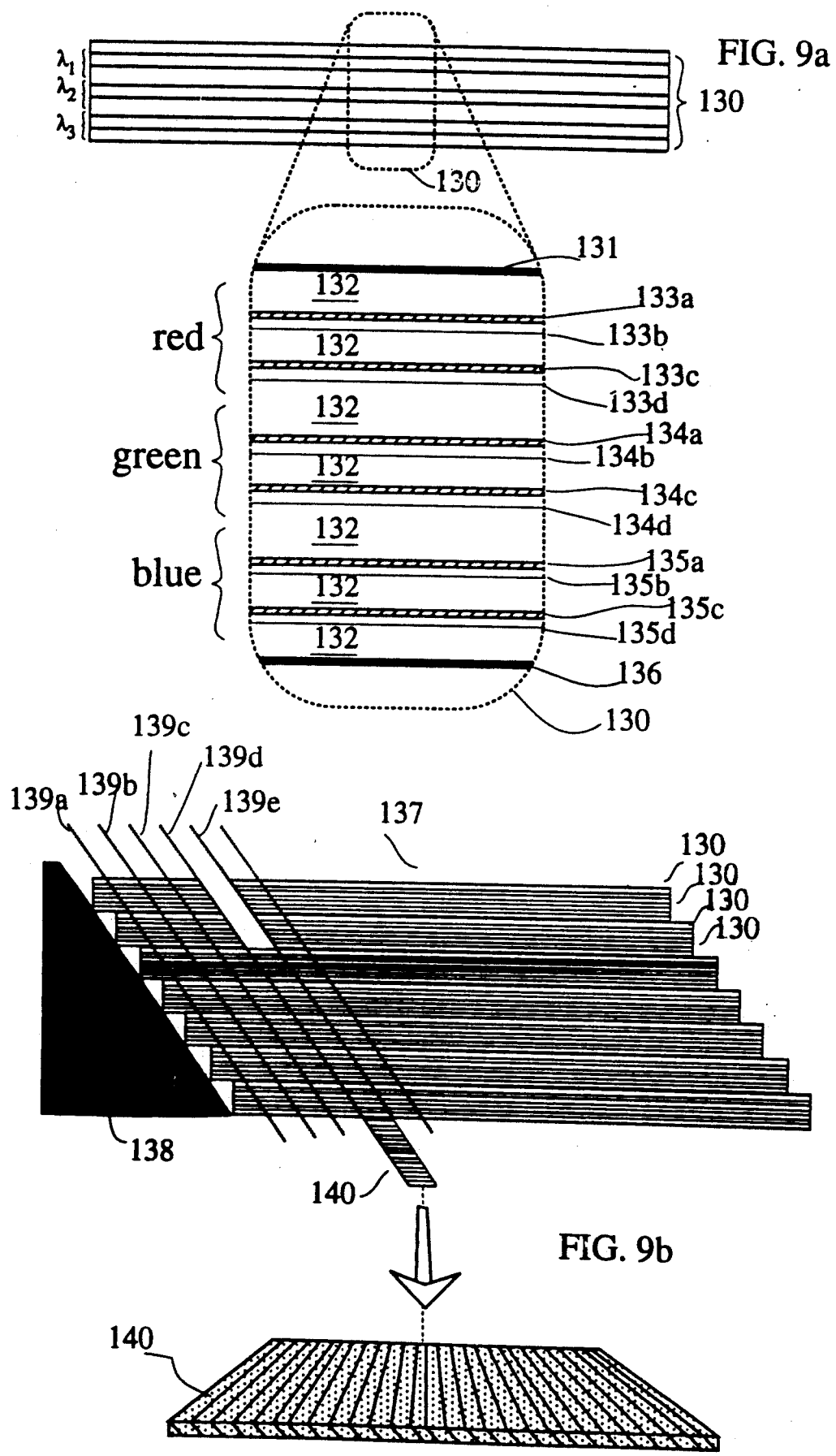

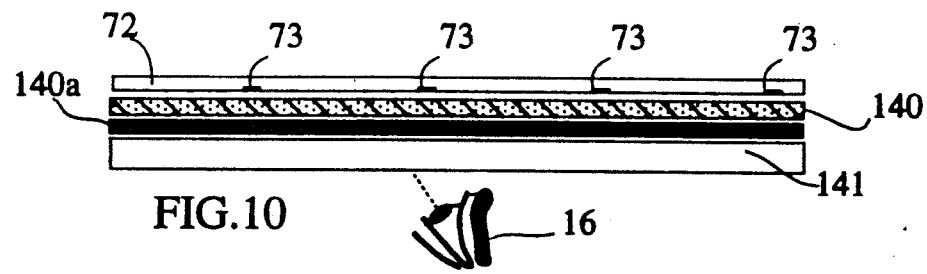
FIG.10
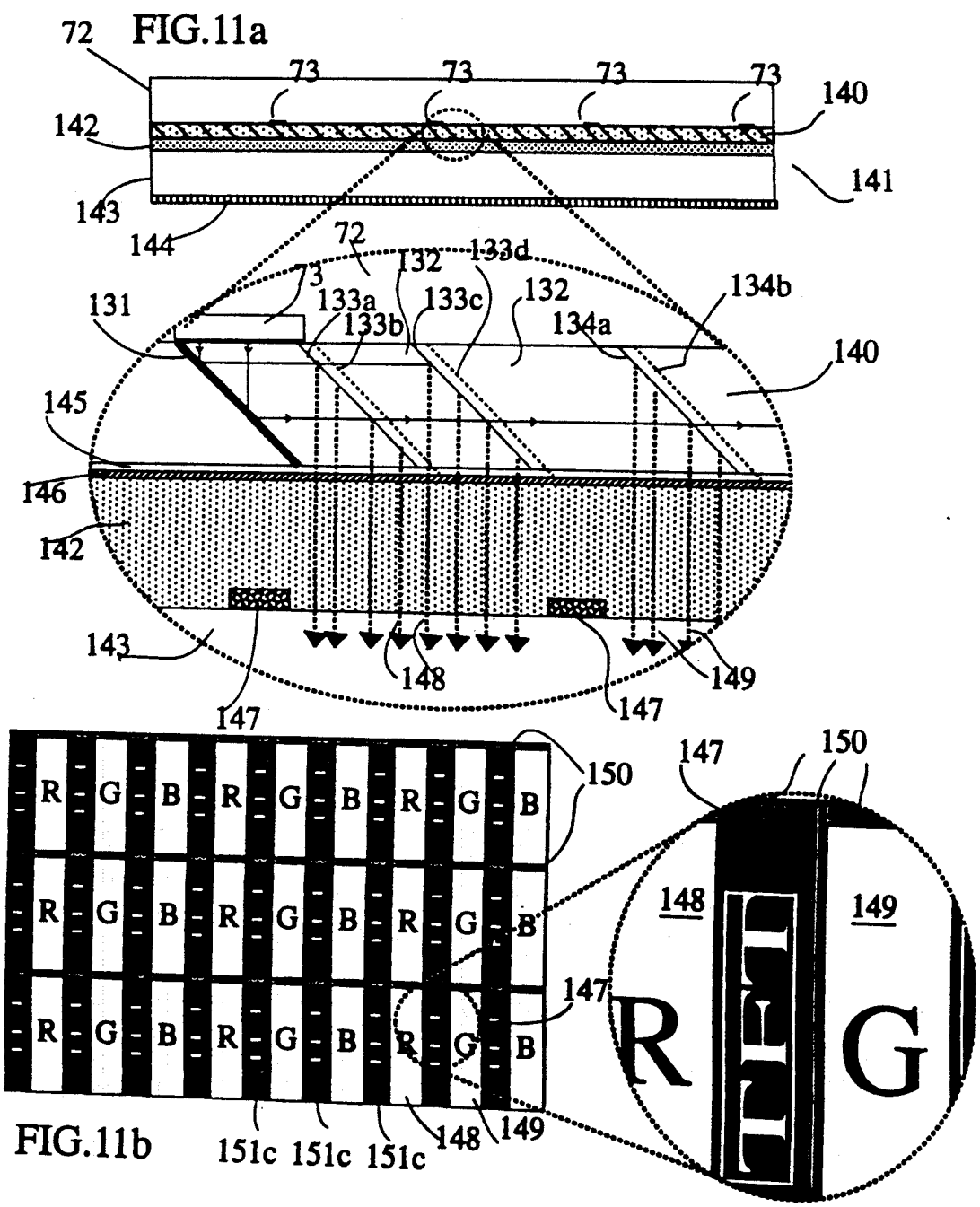
FIG.11a
FIG.11b

POLARIZING WAVELENGTH SEPARATOR

BACKGROUND OF THE INVENTION

1. Field of the Invention

This invention relates to polarizers, and in particular to high efficiency micro-polarizing filters which are known as "Faris" polarizing wavelength separators.

2. Description of Prior Art

Color liquid crystal displays for projection and direct viewing rely on polarizers and filters for their operation. In the field of 3-D movies and 3-D computer displays which employ polarization, coding of the stereo image pair use large sheet polarizers. The field also relates the fabrication of micro-polarizer arrays for shutters, light valves, and other 3-D stereo displays.

At present, most laptop computers use monochrome liquid crystal displays, LCD, and recently 14" color LCD's have been announced. It is projected that in the late 90's, color LCD's will capture more than 50% share of the display market, and CRT-based displays will lose their dominance. Projection color LCDs are used for large viewing audience, in education and entertainment, with screens larger than 100" diagonal.

Direct View Flat Color LCD

Liquid crystal display operation is based on modulating the transmission of polarized light by means of an electric field applied across the liquid crystal layer. The field rotates the polarization of light so that, depending on the amount of rotation, it is either transmitted or absorbed by a front polarizer. This light valve action is used in a large variety of displays with different liquid crystal material and configurations. FIG. 1a illustrates a cross section (side view) of a portion of a typical active matrix twisted nematic liquid crystal display, and FIG. 1b, is a top view of the display showing a pixel array each of which consists of three R, G, B sub-pixels. Each sub-pixel has a thin film transistor, TFT, 6 and either red 10, green 11, or blue 12 filter. The liquid crystal material 5 is interposed between two parts, the back side and the front side. The back side comprises an alignment layer 14 (right inset FIG. 1a) to align the liquid crystal 5, a transparent indium-tin-oxide (ITO) electrode 13, the filters 10, 11, 12, a patterned black matrix 9 (an absorber necessary for achieving high contrast), back glass substrate 4, a back polarizer 3, and a back light source 1. The front side comprises a TFT 6 fabricated on the front glass substrate 7 (right inset FIG. 1a), and a front polarizer 8 (also called analyzer). Each TFT 6 is based on amorphous silicon technology, and fabricated by steps well known in the art. Several different LCD technologies are described by Haruhiro Matino et al U.S. Pat. No. 4,946,259; Mamoru et al, Society of Information Display, SID 88 DIGEST, p242, 1988; M. Katayama, et al, Society of Information Display, SID 88 DIGEST, p 310, 1988; and Kenichi Niki, et al, Society of Information Display, SID 88 DIGEST, p 322, 1988. All prior art teachings of LCD color displays have one common problem. They all suffer from inefficient use of the intensity of the back light source 1 which provides unpolarized white illumination 2. It is well known that typically about 5% of the light is used to create the image and 95% is wasted. This inefficiency leads to the requirement of large power, large battery and more weight of the overall system. The inefficiency results from four main sources; i) the back polarizer 3 and front polarizer 8 combination transmit between 30% and 38%; ii) the RGB filters transmit less than 30%; iii) the fill factor, FF, represent another 30% to 50% loss because the areas occupied by the TFT 6, the wiring 15, the black matrix 9 (inset FIG. 1e) have a shadowing effect, i.e., they are illuminated but do not contribute to the display; and iv) 20% loss due to several interfaces between a plurality of layers where mismatches in the indices of refraction exist. As described in the paper by T. Nagatsuka et al, Society of Information Display, SID 85 DIGEST, p74 (1985), proper preparation of the polarizers improves the brightness and the contrast of LCD. The main problem of prior art sheet polarizers used in LCDs is fundamental and cannot be solved because the polarizing mechanism is absorptive. Such polarizers are made of stretched polyvinyl alcohol that is treated with an iodine solution which gives it the polarizing property. The maximum theoretical efficiency for converting unpolarized light to polarized light cannot exceed 50%. In fact it is limited to less than 45% for polarizers which have acceptable extinction ratios. The polarizer and analyzer combination of typical display wastes 60-65% of the back light, requiring brighter light source 1 and adding to the size and weight of the systems. Prior art filters are also absorptive, that is, when illuminated with white light, each filter transmits only one primary color band, and absorbs (converts into heat) the other two primary color bands, further wasting more than 66% of the back light intensity. Losses due to the fill factor, FF, are due to the areas of the sub-pixel 11 (FIG. 1e) that are devoted to the TFT 6, the black matrix 9, and the wiring 15. These areas block the light either by reflection or absorption which otherwise would have contributed to the brightness of the display. The FF is therefore defined as the ratio of the areas blocking the light to the total sub-pixel area. Finally, as shown in FIG. 1a, the light path crosses many interfaces of several different layers having different indices of refraction. It is well known that these mismatched interfaces cause reflections which can add up to 20% lost light which otherwise would have contributed to the brightness of the display.

In addition to their low efficiency, prior art LCDs also have low yields, especially as the display areas are made larger. The yield, and hence the manufacturing cost of LCD, its performance, brightness and contrast, are affected by three main elements: i) the TFT fabrication which involves several steps; ii) the RGB filters which also involve numerous steps; and iii) the polarizer properties. Each color filter is made on a separate substrate, patterned, and then transferred to the back glass substrate 4. This is done in a sequential manner, with each color requiring 4 to 5 steps. Prior art approaches to making filters remain plagued with problems of reproducibility, color control, and high cost. Proposals to solve some of these problems are found in the papers by William Latham et al., Society of Information Display, SID 87 DIGEST, p 379, (1987), and by Donald Bolon et al., Society of Information Display, SID 87 DIGEST, p 395, (1987).

Therefore, from the foregoing discussion, it is clear that there is a need for recovering the 95% or more of the wasted back light intensity through more efficient polarizers and filters. There is also the need for improving the yield by means of new filter fabrication methods and new LCD architectures. My co-pending application Ser. No. 07/561,104 teaches how to produce polarizing filter arrays with higher polarizing efficiency, and improves the yield by using a new micro-filter arrays, but it does not teach how to eliminate the ⅔ waste due to the color filter absorption, nor does it deal with the losses due to the fill factor FF. John A. van Raalte, U.S. Pat. No. 4,798,448 shows an illuminating system for producing high efficiency polarized light which is then separated into RGB colors by means of a diffraction grating. The illuminating system is complex, has plurality of elements, (and hence high cost), does not have a low profile necessary for laptop and note book computer displays and cannot be used as a substrate (as in patent application Ser. No. 07/561,104) which would enable it to be made an integral part of the whole LCD display. The grating means to separate the RGB wavelength is difficult to design for high efficiency for the LCD application and at the same time maintain a very low profile display. As described below, the present invention teaches how to eliminate the losses due to the filters, polarizers, and the fill factor, thereby improving the efficiency by more than a factor of 10. It also teaches the elimination of prior art filters and their complex manufacturing steps and hence improving the yield and lowering the cost while maintaining ultra-low profile display.

Projection Color LCD

Projection color OCDs which are capable of 100" diagonal displays are already on the market. They belong to two classes: the transmissive liquid crystal light valve, TLCLV, which modulates the transmission of the illuminating light, and the reflective liquid crystal light valve, RLCLV which modulates the reflection of the illuminating light. Typical state-of-the-art TLCLV projection systems are described in [Ref1, Ref2, Ref3]; and RLCLV systems in [Ref5; Ref6]. FIG. 2 illustrates a representative prior art projection system of the TLCLV class. It comprises a metal halide illumination source 20 which has red 32, green 33, and blue 34 components; a set of conventional mirrors 21, 22, 23; a set of dichroic mirrors 24, 25, 26, 27, three TLCLVs 29, 30, 31 (one for each primary color) and a projection lens 28. The dichroic mirrors are selective reflectors designed to reflect only one color band. They are made by depositing, in an appropriate sequence, a plurality of thin film dielectrics having different refractive indices and thicknesses. The dichroic mirror 24 reflects selectively only the red component 32a and transmits the green 33a and the blue 34a components. Similarly mirrors 25, 23, reflect only the green and blue components respectively. The separated color components 32b, 33b, 34b are modulated by their respective TLCLV 29, 30, 31 and recombined by the dichroic mirrors 26, 27 and subsequently projected on the screen by means of lens 28. The construction of a TLCLV is identical to that described in FIG. 1 without the filters but with a higher pixel density It has inefficient polarizers 29b, 29d, and a smaller fill factor (less transmission) due to higher pixel density. The illumination efficiency of this prior art system according to Ref1 is less than 1%, as a result of the inefficient dichroic mirrors, polarizers, fill factor, and other reflection losses. The wasted 99% of the energy is absorbed in the package, requiring cooling fans and special cooling fins in the TLCLV itself otherwise the temperature rise will adversely affect the operation of the valve. A prior art attempt to improve the efficiency is described by Masao Imae et al. Ref.[SPIE]. They improve the efficiency by means of a polarization converter made of several prism components. Even though this prior art nearly doubles the overall system efficiency from 1% to 2%, 98% of the illumination is still wasted.

FIG. 3 illustrates a representative prior projection system that utilizes the RLCLV class described by Victor Fritz [SPIE] for monochrome, and shown here for color. It comprises a light source 20; conventional mirrors 37, 38; dichroic mirrors 35, 36, 39, 40; a projection lens 28; polarizing prisms 41, 42, 43; and RLCLV elements 44, 45, 46. The polarizing prisms reflect the "S" polarization state 47 and transmits the "P" state (this is discarded wasting 50% of the illumination). The red beam 49 is converted into "S" polarized beam 49s which illuminates the valve 44. Valve 44 modulates the reflection of beam 49s by rotating is polarization state by 90 degrees to the orthogonal "P" state. This is transmitted by the polarizing prism 41 as a red beam 49p that carries the image information. The image information is written into the valve 44 by means of a raster scanning laser beam or a raster scanned CRT (not shown). Similarly, the green 50p and blue 51p beams are modulated with the image information. All three beams 49p, 50p, 51p are subsequently projected on a screen by lens 28. The RLCLV projection system has the same illumination inefficiencies as the TLCLV (FIG. 2) but bulkier and larger because of the added polarizing prisms and the scanning writing beams. It is shown that the novel passive optical element, PWS, according to the present invention, solves not only the problems associated with direct view LCDs but also those of projection systems, namely: illumination inefficiencies, bulkiness, low yield and cost.

SUMMARY OF THE INVENTION

The principal object of the present invention is to provide means for radically increasing, by at least a factor of 10, the illumination efficiency of direct view flat panel color LCDs and projection LCDs and therefore reducing their power requirements, weight, and size.

Another principal object of this invention is to reduce the manufacturing steps of color LCDs by eliminating the conventional filters and filter processing steps, thereby increasing the yield and lowering cost.

Another principal object of this invention is to provide a new element called the Faris Polarizing Wavelength Separator, PWS, which is an array of micropolarizers that convert unpolarized white light into a polarized array of light strips that are spectrally and spatially separated. The conversion efficiency of said PWS elements approaches 100%.

Another object of this invention is to provide a highly efficient backlighting system that is integrated into the flat panel LCD, hence leading to an ultra-low profile display. This lighting system combines the polarizers and filters.

Another object of this invention is to produce micropolarizing filter array elements which reduce the illumination losses in prior LCDs resulting from the polarizers, the filters, and the fill factor.

Another object of this invention is to provide means for making polarizing filter arrays that improve the polarization conversion efficiency to nearly 100% in the transmission mode.

Yet another object of this invention is to provide means for low cost high throughput manufacturing of PWS elements which minimize the number of parts and the number of steps in the manufacture of LCDs, increase the yield and performance, and reduce cost.

These and other objects will become clear as the description of the preferred embodiments are presented.

BRIEF DESCRIPTION OF THE DRAWINGS

FIGS. 1a-b describe prior art active matrix twisted nematic liquid crystal display system.

FIGS. 6a-h are illustrations which explain the operating principles of the PWS element, according to this invention.

FIGS. 7a-d show other configurations which make high efficiency polarizers for a single wavelength and broad band operations.

FIGS. 8a-b illustrate the construction and the operation of a PWS according to this invention.

FIG. 8c shows how to obtain linearly polarized PWS element by using quarter-wave retarding layers.

FIG. 9a-b illustrates the method for high throughput, low cost, manufacturing of the PWS elements, another preferred embodiments of the present invention.

FIG. 10 illustrates the applications of the PWS in flat panel direct view LCD.

FIGS. 11a-b illustrate the use of PWS element fully integrated with the backlight, and other liquid crystal display components, resulting in the lowest profile display.

DETAILED DESCRIPTION OF THE PREFERRED EMBODIMENTS

This is an invention of a new optical element called the Polarizing Wavelength Separator, PWS, which is an array of micro-polarizers that convert unpolarized white light into a polarized array of light strips or bands that are spectrally and spatially separated, with a conversion efficiency that can theoretically approach 100%. The light strips of different wavelengths have widths and spacings (the spaces between strips are dark areas) that can be controlled during the manufacturing process. It is also shown that when PWS elements are used in liquid crystal displays (direct view and projection) prior art problems of low yield, high cost, low brightness, and bulkiness are solved. A manufacturing method is also shown that produces PWS elements inexpensively. My co-pending application Ser. No. 07/561,104 teaches how to make polarizing filter arrays, but does not address the ability to produce PWS elements as described herein, especially the production of spectrally and spatially separated bands. This production of bands improves the prior art filtering efficiency by a factor of 3 and improves the fill factor of LCD to more than 90%. Another important new feature of the PWS elements is that the wavelengths of the strips can be randomly ordered instead of having values of ascending or descending order. Diffractive elements such as gratings and dispersive elements such as prisms are known to separate white light spatially into its constituent wavelengths (ascending or descending order). To my knowledge, there is no prior art that teaches how to produce the features of PWS which simultaneously performs these three functions: polarization, wavelength separation, and spatial separation.

Figure 4A:
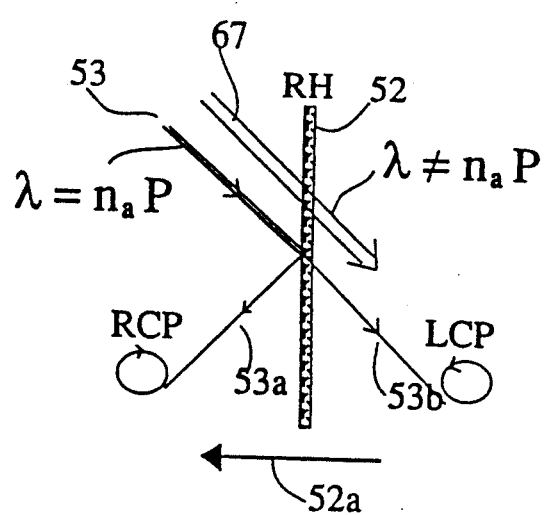
FIGS. 4a-e illustrates the fundamental properties of cholesteric liquid crystals and polarized light. Said properties are relied upon to construct the preferred embodiments of this invention.

The construction of the PWS and its features depend on the well known properties of chiral liquid crystals, CLC, (also called cholesteric liquid crystals) described in the following references: S. D. Jacobs et al, Journal of the Optical Society of America, B, Vol. 5(9), pp. 1962-1978 (September 1988); ii) Martin Schadt and Jurg Funfschilling, Society of Information Displays, SID 90 DIGEST, p 324 (1990); and iii) Robert Maurer, et al, Society of Information Displays, SID 90 DIGEST, p 110 (1990). These liquid crystals spontaneously order themselves in an optically active structure of a left handed (LH) helix or a right handed (RH) helix with a helix pitch P, and an optical axis which coincides with the helix axis. FIG. 4a shows an RH, CLC film 52 (cross section) prepared with its optical axis 52a perpendicular to the film and exhibits the property of selective reflection when a monochromatic beam of wavelength 1, propagating along the helix axis satisfies the relationship $$\lambda = \lambda_0 = n_a P, \quad (1)$$

where $n_a$ is the average refractive index of the CLC material and P is its pitch. Unpolarized light 53 with wavelength $\lambda = \lambda_0$ incident on the film will interact with the helix structure and causes the reflection of 50% of its intensity as right circularly polarized light 53a (RCP), and the other 50% is transmitted as left circularly polarized light 53b (LCP). On the other hand, if the incident light 67 has one or more wavelengths $\lambda$ that are not equal to $\lambda_0$, all the light is transmitted. I remark that equation (1) is strictly valid in the case where the angle of incidence $\theta$ (measured from the helix axis) is zero. For a non-zero value of $\theta$, the effective value of $\lambda_0$ shifts to a shorter wavelength $\lambda_\theta$ given by $$\lambda_\theta = \lambda_0 [\cos\{\sin^{-1}(n_a^{-1} \sin\theta)\}] \quad (1a)$$

Figure 4B:
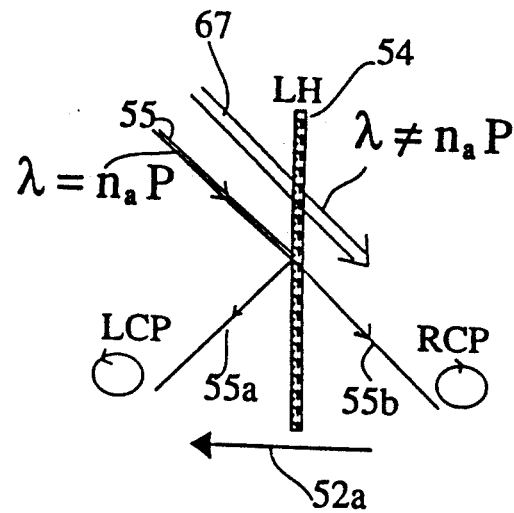

In all subsequent discussion in this application, whenever $\theta$ does not $=0$ it is implied that $\lambda_0$ means $\lambda_\theta$ as given by Eq. (1a).] If the film had an LH helix, FIG. 4b, and the incident unpolarized light 55 satisfies $\lambda = \lambda_0$, 50% of the selectively reflected polarized light 55a would have the LCP state, and the other 50% transmitted part 55b would have the RCP state. It is important to note that this selective reflection polarizing property does not involve depend on an absorptive mechanism as is the case with conventional sheet polarizer. This fundamental fact is the source of the high efficiency of the PWS element.

Figure 4C:
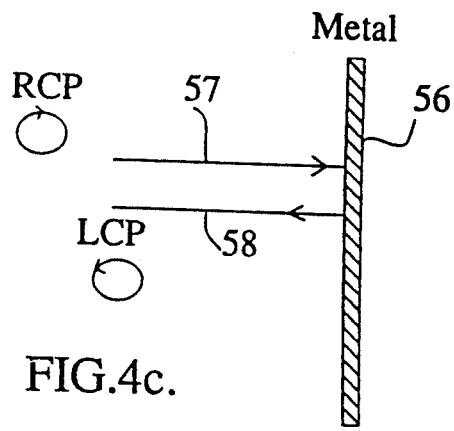
Figure 4D:
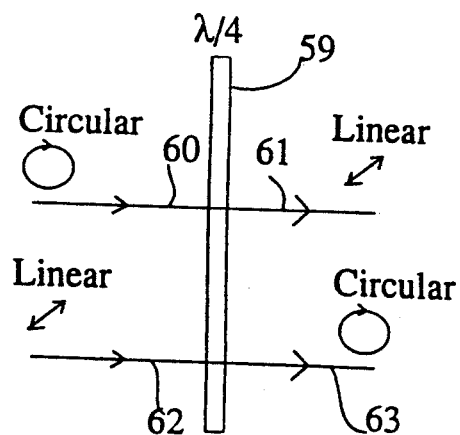
Figure 4E:
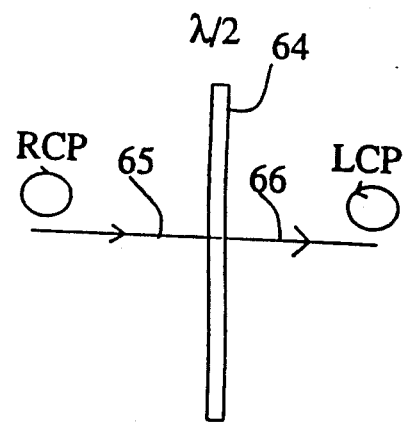

A fundamental property of light is that it can have only two independent, mutually orthogonal polarization states, either circular, LCP and RCP states, or linear states. Other polarization properties of light used in this invention are shown in FIGS. 4c–d. FIG. 4c shows that an LCP light 57 normally incident on a metallic reflector 56 is converted into an RCP light 58 because the metal causes a phase shift of 180° between the independent electric field vector components. A quarter wave retarder 59, FIG. 4d, causes a 90° phase shift and converts a circular light 60 into linear 61, and a linear length 62 into circular 63. In FIG. 4e, a half-wave retarder 64 converts RCP light 65 into LCP light 66 and vice versa by causing a phase shift of between the independent electric field vector components.

The first preferred embodiment of this invention is the lighting system 70 (FIG. 5a) which comprises the PWS element 71 and a light source 72 which emits unpolarized white light in the form of light strips 73. As shown in FIG. 5b, each said light strip 73 is separated by PWS 71 into three red 74, green 75, and blue 76 color bands that are also spatially separated by dark bands 77, 78, 79, 80 (no illumination). The triad of color bands, spatially separated, are periodically repeated as a regular array that makes up the entire PWS 71. As explained in more detail below, the CLC layers 82, 83, 84, 85, 86, 87 and the metallic layers 81, 88 are responsible for the PWS operation. Large area PWS elements ranging in thickness from 100 microns to several centimeters can be produced. An entire thin PWS sheet can be used in flat panel direct view LCD (>10" diagonal) or smaller parts of a large area PWS may be used as in projection LCD or other applications. The PWS functions as a polarizing filter array with the added benefit of spatial separation of light. The most important feature of the PWS is the fact that all the energy of the collimated unpolarized light beam 73 is converted into polarized light, and that the colors are separated with nearly 100% efficiency because there is no absorptive mechanisms that convert light into heat. Note that this function is carried out in a transmissive mode by means of a very thin element 71 that is not taught by prior art.

A fundamental property of unpolarized light is that exactly half of its energy is in one polarization state, RCP, and the other half is the other orthogonal polarization state, LCP (the two independent orthogonal states could be linearly polarized). The operating principles of the PWS is now explained using FIGS. 6–8. The simplest element of this invention, FIG. 6a, comprises two identical LH, CLC layers 89, 90 that are at an angle of 45° with respect to the normal or vertical direction, and are separated by a distance S, 93. According to the fundamental properties of CLC described above (FIG. 4b), an incident beam of unpolarized light 73 of wavelength satisfying Eq. 1 above, and having a width $W_B$, is separated into an RCP beam 91 that is transmitted through CLC 89, and an LCP beam 92 that is reflected first by CLC 89 and then by CLC 90. Thus two beams 91, 92 having orthogonal polarization states RCP and LCP emerge separated from each other by a distance S. This distance S determines the width of the dark (not illuminated) region 93 between the beams 91, 92. And it can be varied. FIGS. 6c–d shows a particular configuration where S=0. The black areas represent absence of illumination. The CLC layers 89, 90, because of the absence of an absorptive mechanism, are perfect reflectors and have been shown to have reflectivities better than metals. Therefore, 50% of the incident energy 73 is converted into RCP 91 and the other 50% into LCP 92. On the other hand, polarizers and filters used in prior art displays are based on absorptive mechanisms and lose most of the light energy into heat. To convert all the incident light beam 73 into one polarization state, a half-wave retarder layer 94 is added after the CLC layer 89 as shown in FIG. 6e. The retarder, as described in FIG. 4e, converts the RCP light beam transmitted through CLC 89 into an LCP beam 95, and the result is that all the unpolarized light 73 is converted to polarized light 95, 92 having one polarization state, LCP as in FIG. 6f. Thus, unpolarized light beam 73 is fully converted to a single polarized beam (the sum of beams 92 and 95) having an LCP and with a 100% conversion efficiency. In another embodiment illustrated in FIGS. 6g–h, an unpolarized beam 73 is 100% converted into a linearly polarized beam 99, 100 using quarter-wave retarders 98a, 98b on both sides of CLC 96, and 98c, 98d, on both sides of CLC 97. The quarter wave retarders convert the circularly polarized light into linear polarization according to FIG. 4d. In yet an other embodiment, metallic reflectors instead of half-wave retarders are used to convert LCP into RCP as illustrated in FIG. 7a. The unpolarized beam 73 is split by means of CLC layer 101 into an RCP beam 103, and an LCP beam that is reflected by layer 101 and then reflected and 180° phase-shifted by the metallic reflector 102 (with a retarder element to compensate for the 45° angle of incidence), to produce a second RCP beam 104. Thus all the unpolarized beam 73 is fully converted into RCP beams 103, 104, FIG. 7b. In an other embodiment, a broad-band polarizer is produced as in FIG. 7c by having a plurality of left handed (LH) CLC layers 105a, 105b, 105c (inset FIG. 7c) each satisfying Eq. 1 at different wavelengths. Unpolarized white beam 73 is split by CLC 105 into an RCP white beam 107 which is transmitted and an LCP white beam which is reflected first by CLC 105 and then reflected and 180° phase-shifted by a metallic reflector 106 to produce RCP beam 108, FIG. 7d.

The preferred embodiment of the invention for making the PWS element is illustrated in FIG. 8a. Its construction and operating principles are based on the concepts described above in connection with simpler elements as shown in FIGS. 6–7. The PWS element comprises a metallic reflector 109, three pairs of LH, CLC layers 110, 112, 117, 119, 124, 126. CLC pair 110, 112 is tuned to satisfy Eq. 1, to selectively reflect the red color band, pair 117, 119 for green band, and pair 124, 126 for the blue band. Half-wave retarder layers 111, 118, and 125 are placed after CLC layers 110, 117, and 124 respectively to convert the transmitted RCP beams into LCP beams. Said retarders are respectively designed for the red, green and blue bands. A beam of unpolarized white light 73 having three color bands, red, green and blue is converted into three red, green, and blue beams that are left-circularly-polarized (LCP) and spatially separated by a distance S. First the incident beam is reflected by the reflector 109. Then the red LCP component is reflected by the first red LH CLC layer 110 forming red a LCP beam 114, the rest of the light is transmitted through 110. The retarder layer 111 converts the red RCP component into a second red LCP component 115 which reflected by the second red CLC 112, mean while, the remaining green and blue beams are transmitted through first and second red CLC layers 110, 112. Using the same principles, the remaining CLC layers, and retarders, form the green LCP beams 121, 122, and the blue LCP beams 128, 129. The red, green and blue beams are separated by dark spaces 120 and 127 as in FIG. 8b. An entire PWS array is constructed by repeating the PWS elements shown in FIG. 8, thus making the PWS sheet 71 as the preferred embodiment. For practical implementation of the PWS concepts, CLC layers in the form of solid polymer (plastic) sheets are preferred. Examples of such materials are the LC-silicone polymers described by Kreuzer and Gawhary in U.S. Pat. No. 4,410,570. Other CLC materials listed by Jacobs et al may also be used. Typical CLC layer thicknesses are in the range of 20 to 40 wavelengths, or 10 to 20 microns. Although the above embodiments for making PWS elements employ left handed (LH) helix CLC layers, it is also possible to use right handed (RH) materials or a combination LH and RH. Persons skilled in the art may find other configurations PWS elements described herein by using different arrangements of LH and RH CLC layers in conjunction with retarding layers of appropriate phase shift.

A high throughput, low cost method for fabricating PWS sheets is described in FIG. 9. The starting material is a cell sheet (typical size is 36"×36") that comprises a plurality of layers laminated together with a clear adhesive. Said plurality of layers can be designed to produce any of the PWS elements described above in FIGS. 6-8 or any other variations. To produce the PWS preferred embodiment, that converts unpolarized white light into polarized red, green, and blue color bands that are spatially separated, the cell sheet 130 is designed to comprise two outer metallic layers 131, 136, three sets of CLC and half-wave retarder layers, and seven optically clear substrate layers 132. Said substrate layers are made of glass of clear plastics such as polycarbonate, cellulose butyrates, or cellulose acetate, or other clear substrates may be use so long as their index of refraction matches that of the CLC layers. The first set which is designed to select the red band, comprises LH CLC layers 133a, 133c, (10 to 20 micron thick) and half-wave retarder layers 133b, 133d (10 micron thick) separated from their respective CLC layers by clear adhesive layers (1-5 micron thick). The second and third sets are designed to select the green and blue bands respectively, and comprise CLC layers 134a, 134c, 135a, 135c, and retarder layers 134b, 134d, 135b, 135d. The clear substrates 132 have thicknesses as small as 100 micron (for flat panel LCD) or as large as 5 cm (for projection LCD) and are designed to achieve the desired spatial color band separation 78, 79, 80 in FIG. 5. The three sets can be rearranged in any desired order, to obtain RGB, GBR, or BRG.

The next step in manufacturing is to form a stack 137 (FIG. 9b) comprising a large number of cell sheets 130 which are adhesively bonded together. To minimize material waste, the sheets 130 are pushed against an inclined wall 138 (45°). The stack is subsequently sliced at a 45° angle by known slicing means, forming several slices 139a, 139b, 139c, 139d, 139e. These slices are then polished and anti-reflection coated (if necessary) to produce the finished PWS 140, FIG. 9b. Note that the manufacturing process is simple and can achieve high throughput and low cost.

PWS Applications in Direct View LCD

By exploiting the properties of inexpensive PWS sheets fabricated according to the method described in FIG. 9, high efficiency, high brightness direct view flat panel color LCD can be realized as illustrated in FIG. 10 and FIG. 11. The first system, FIG. 10, comprises three discrete components: a back light 72, a PWS sheet 140, and an LC panel 141. The second system, FIG. 11a, integrates the backlight 72, the PWS 140, and the LC panel 141 into a single unit. The back light 72 produces unpolarized white light strips 73, and can be made using well known thin film electro-luminescent (TFEL) technology that is capable of delivering very low profile. The LC panel 141 is designed to exploit the fact that PWS produces RGB strips that are separated by dark regions 151a, 151b, 151c, FIG. 11c. The wiring 150, and the thin film transistors 147, FIGS. 11a-b, can be located in said dark regions away from the light strips. Consequently, the red 148 green 149 and blue beams do not meet any obstructions, leading to an effective fill factor (FF) of nearly 100%. The most popular prior art LCD technology has FF of 70% and can be lower than 50% for higher resolution displays. The LCD panel 141, FIGS. 11a-b, is much simplified because the filters 10, 11, 12, and the black absorbing matrix 9 of FIG. 1 are eliminated. Therefore a significant yield improvement and reduction in cost can be realized. Also, in prior art LCD in FIG. 1, the filters 10, 11, 12 waste more than 66% of the light, and the polarizers 3, 8 waste more than 60%. These losses along with losses due to FF, are eliminated by the use of PWS, leading to about a factor of 14 improvement in illumination efficiency. This further leads to smaller, and lighter weight LCD panels and the integrated LCD embodiment in FIGS. 11a-b results in a very low profile display at a lower cost. Here the PWS 140 performs the additional function of the back glass substrate in the prior art systems of FIG. 1 on which the ITO layer 145 and the alignment layer 146 are deposited, becoming an integral part of the LC cell. Furthermore, the light source 72, 73, based on thin film technology can also be deposited on the top surface of the PWS 140. Thus a compact, fully integrated LCD can be produced.

By using the polarizer concept described in FIG. 6a in the manufacture of PWS, a micropolarizing filter array is produced in which the polarization states periodically alternate, for instance between the RCP state and the LCP state. If such PWS is incorporated in the LCD systems of FIGS. 10–11, then image displayed will be in 3-D stereo as describe in my copending application Ser. No. 7/536,190.

PWS Applications in Projection LCD

Figure 2:
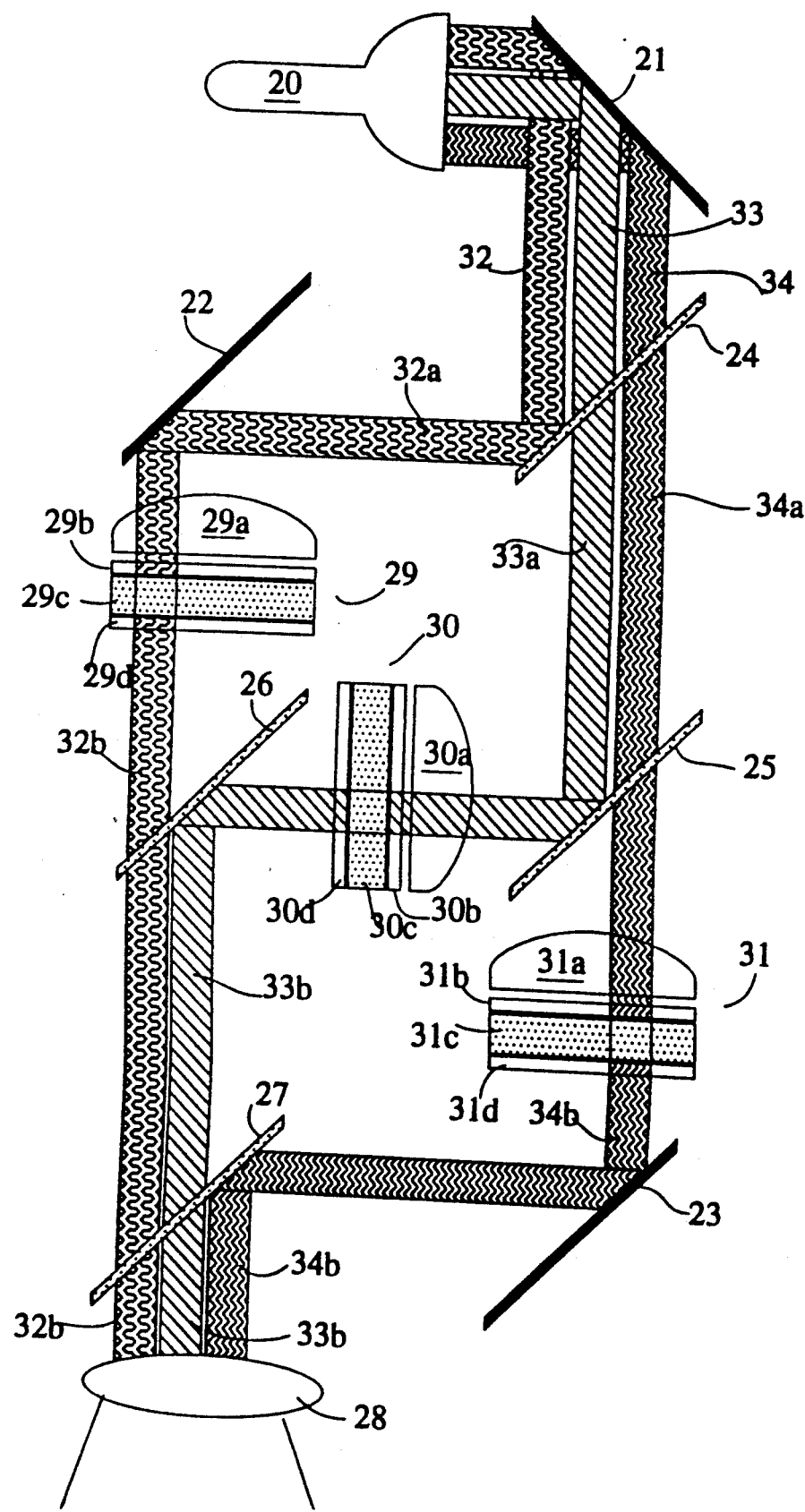
FIG. 2 illustrates prior art projection display system based on transmissive liquid crystal light valves, TLCLV.
Figure 3:
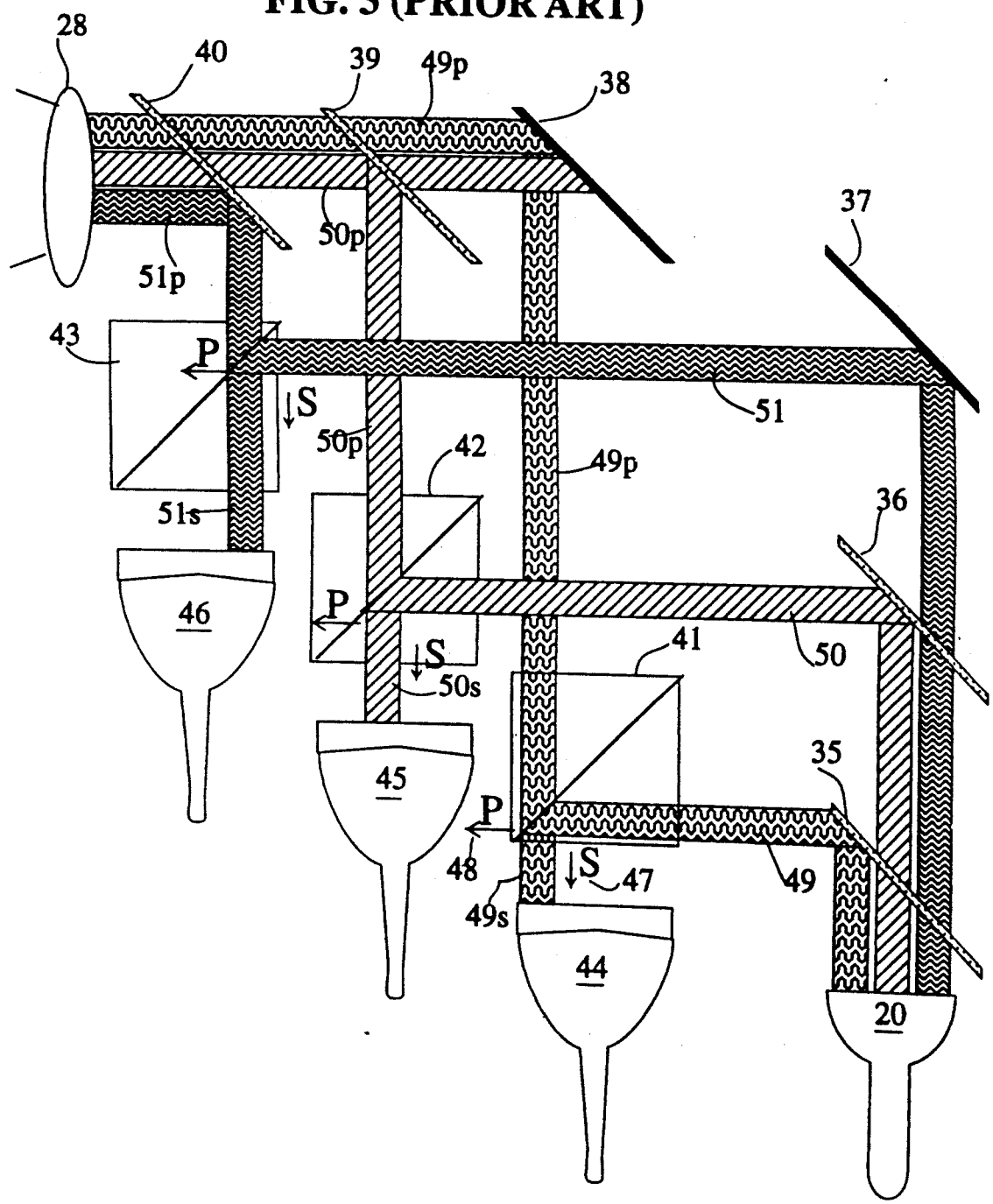
FIG. 3 illustrates prior art projection display system based on reflective liquid crystal light valves, RLCLV.
Figure 12:
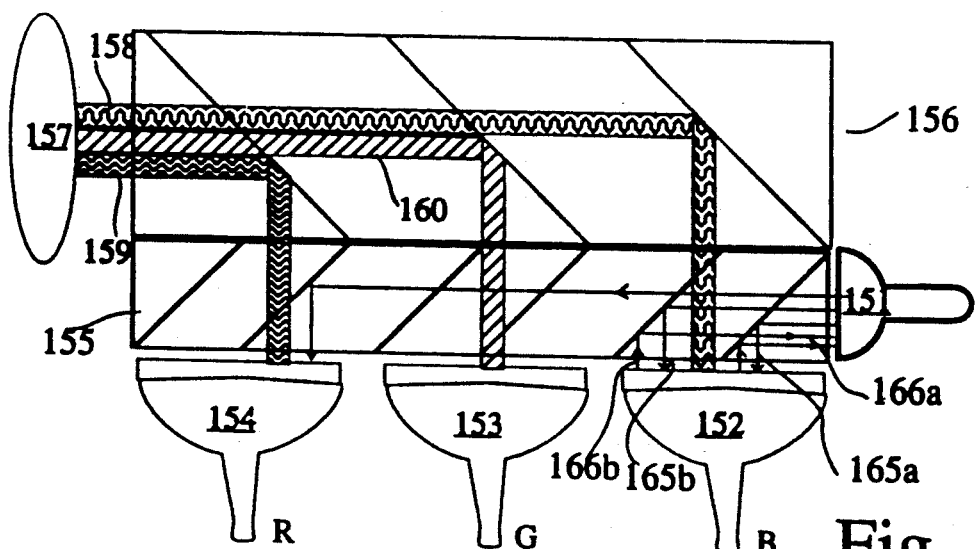
FIG. 12 shows the application of the PWS elements in reflective liquid crystal projection displays.
Figure 13:
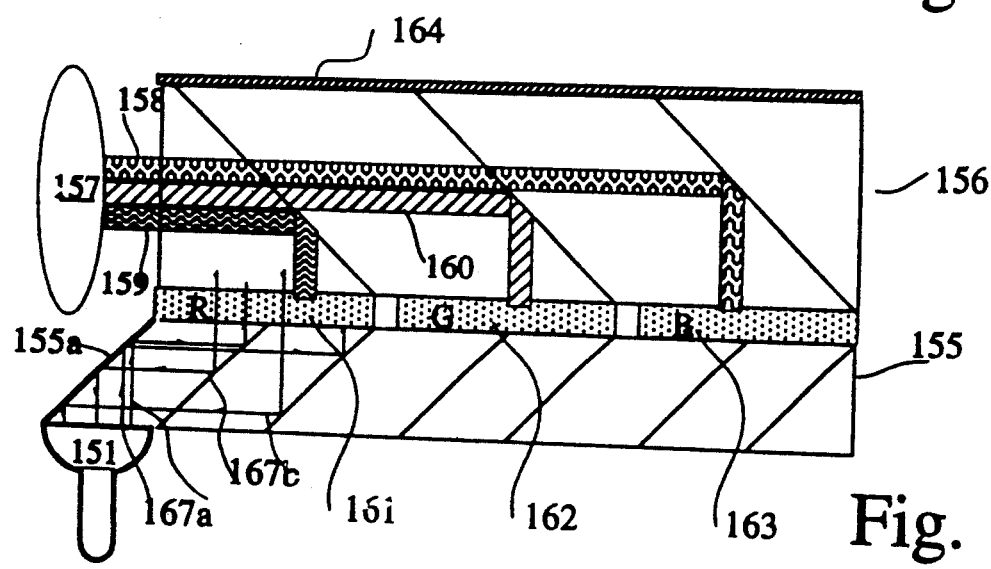
FIGS. 13-14 show the application of the PWS elements in transmissive liquid crystal projection displays.
Figure 14:
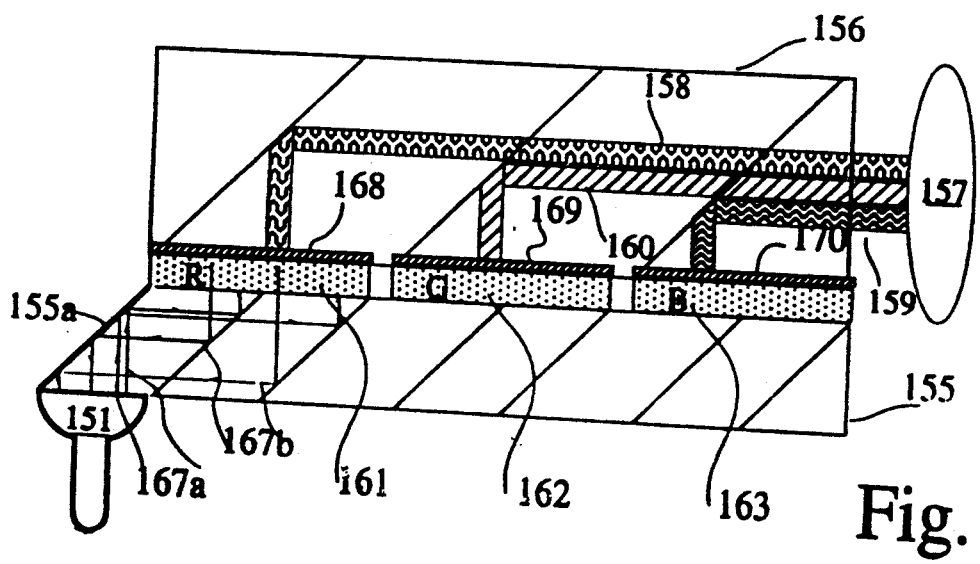

The prior art projection LCD systems described in FIGS. 2-3, can be simplified, made more compact, and made more efficient by using the PWS elements fabricated according to the present invention as described in FIG. 9. FIG. 12 illustrates a much simplified projection RLCLV system when compared with its counterpart of FIG. 3 which uses many more discrete parts. For instance, in the RLCLV system of FIG. 12, two PWS elements 155, 156 replace four discrete dichroic mirrors 35, 36, 39, 40, used in prior art system (FIG. 3), two conventional mirrors 37, 37, and three bulky polarizing prisms which waste more than 50% of the energy. The bottom PWS 155 performs the polarization and wavelength separation functions, while the top PWS 156 performs combiner function. White unpolarized light from the metal halide lamp 151 is separated by PWS 155 into nearly 100% polarized red 158, green 160, and blue 159 beams which are modulated by the reflective LC valves 152, 153, 154 respectively and then combined with the PWS 156 and finally projected on the screen with lens 157. FIG. 13 is another projection system which is based on transmissive LCLV cells 161, 162, 163, and it is also more compact, and more efficient than its prior art counterpart of FIG. 2. The lossy polarizers in prior art TLCLV cells are eliminated, here the PWS elements 155, 156 perform the polarizing function as well as separating, analyzing and combining the color beams. Layer 155a is a metallic reflector that is part of PWS 155. FIG. 4 is another transmissive LCLV embodiment which functions similarly to that of FIG. 12, except that the PWS 156 is rotated 180 degrees in order to place the source 151 and the projection lens at opposite ends, and replacing reflector 164 with CLC reflectors 168, 169, 170 in order to achieve energy recovery or recycling.

Figure 15:
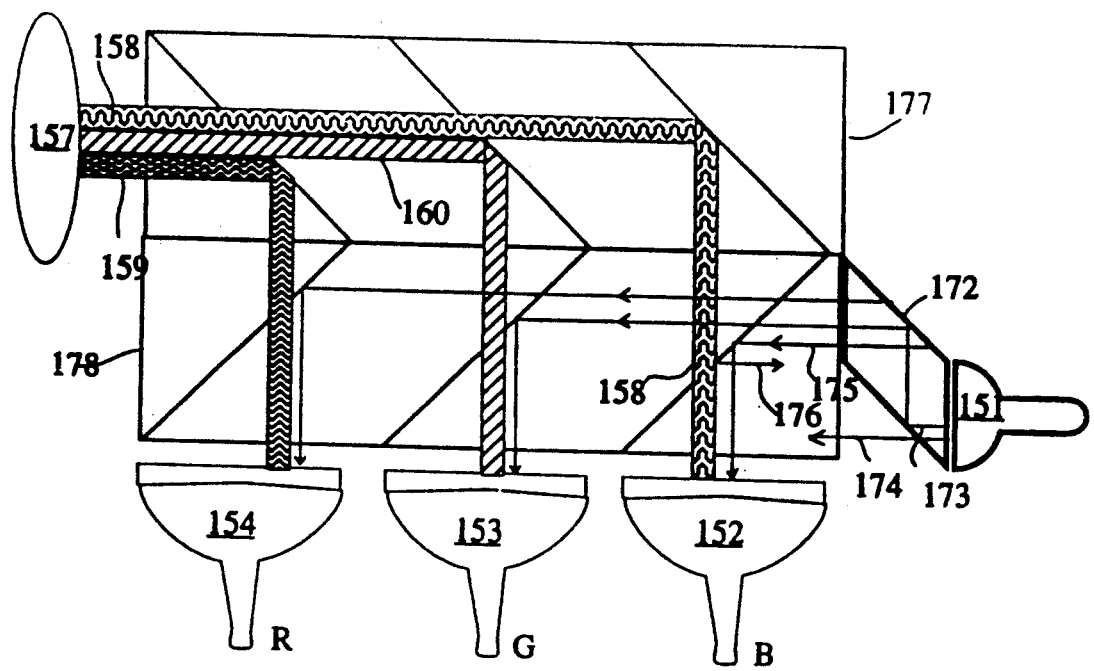
FIG. 15 shows another embodiment of the PWS elements in reflective liquid crystal projection displays using polarized light source.
Figure 16:
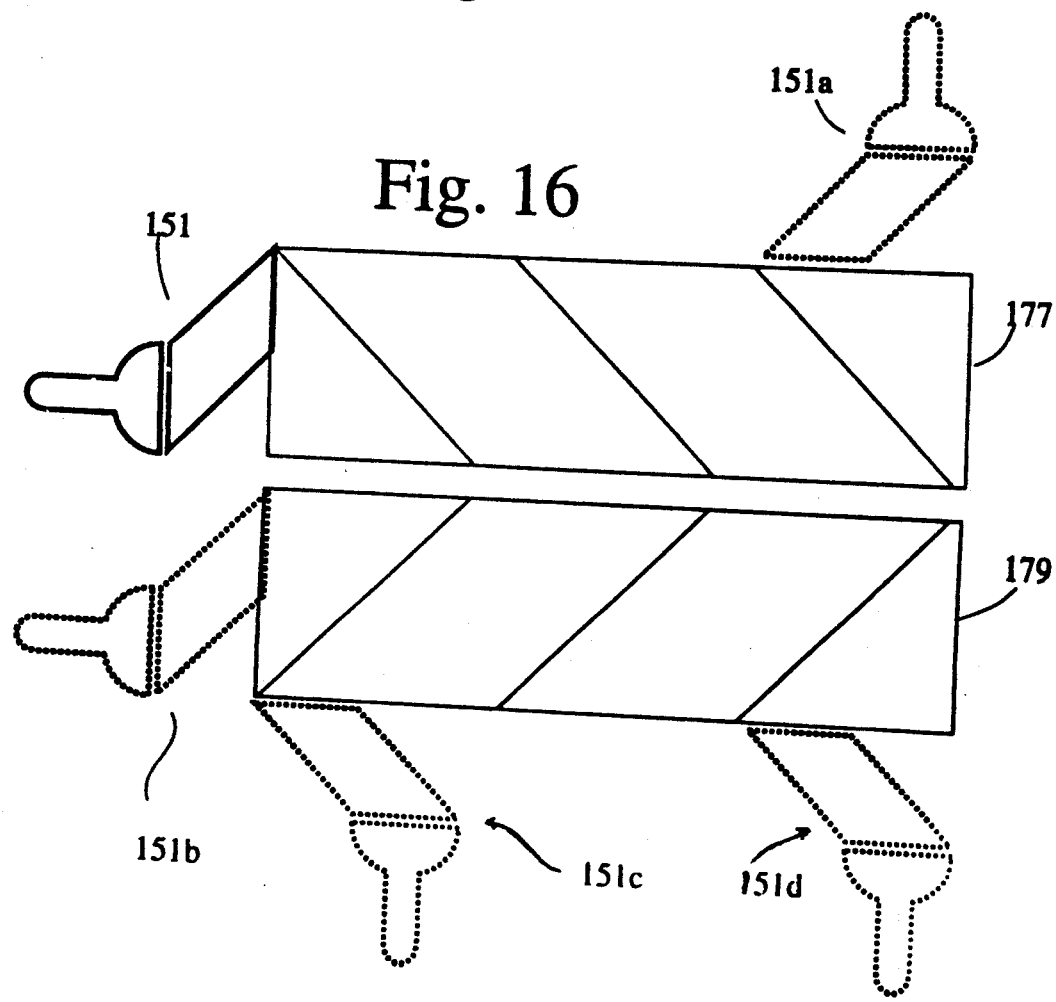
FIG. 16 illustrates the versatility of the PWS with respect to the position of the illuminating light source.

In another embodiment of projection LCD system, FIG. 15, the polarizing function is carried out by the broad-band polarizer 172 based on the concept described in FIG. 7c. The two identical PWS elements 178, 177 perform the color separation and recombination respectively. The advantage of using two identical PWS in FIG. 15, is the flexibility of placing the source 151 in several locations. This is illustrated in FIG. 16, wherein sources 151, 151a, 151b, 151c, 151d, are placed at different ends with respect to PWS 177, 179.

Figure 17:
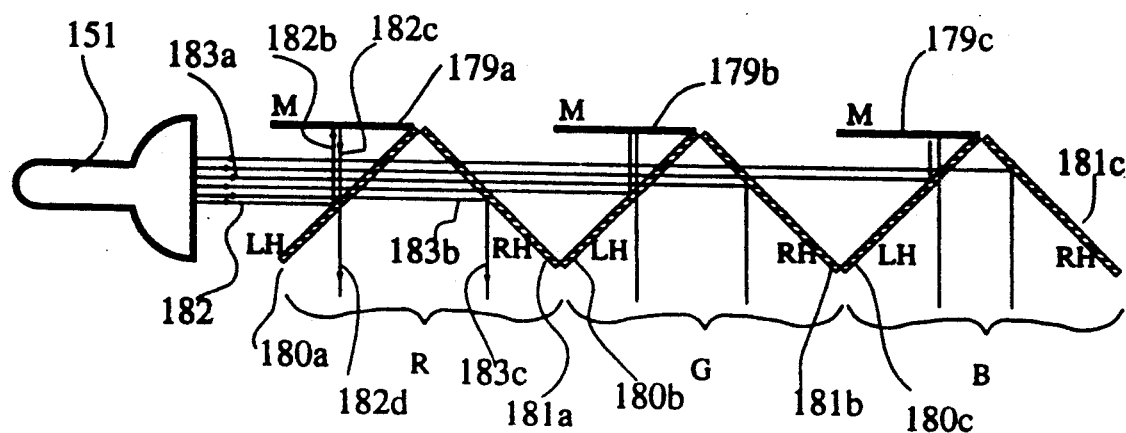
FIG. 17 shows prior art use of cholesteric liquid crystals in projection displays.

A significant prior art described by Schadt and Funfschilling and illustrated in FIG. 17 teaches how to separate unpolarized white beam 182a, 183a into polarized red, green, blue beams. It uses metallic reflectors, 179a, 179b, 179c, and three CLC pairs 180, 181, one for each color. Each pair consists of left handed helix CLC, LH, and a right handed helix CLC, RH. It operates as follows: Let ray 182a be a red left circularly polarized, LCP, and ray 183a be a red RCP. LCP Ray 182a is reflected as ray 182b by the LH CLC layer 180a and then reflected and 180° phase shifted by metallic layer 179a and converted into RCP ray 182c, which can be transmitted by CLC 180a as RCP ray 182d. RCP ray 183a is transmitted as 183b and reflected by RH CLC 181a, as unchanged RCP ray 183c. Thus all the red light is separated and polarized. Similarly, the the unpolarized green and blue components are polarized and separated by the rest of the components.

Figure 5:
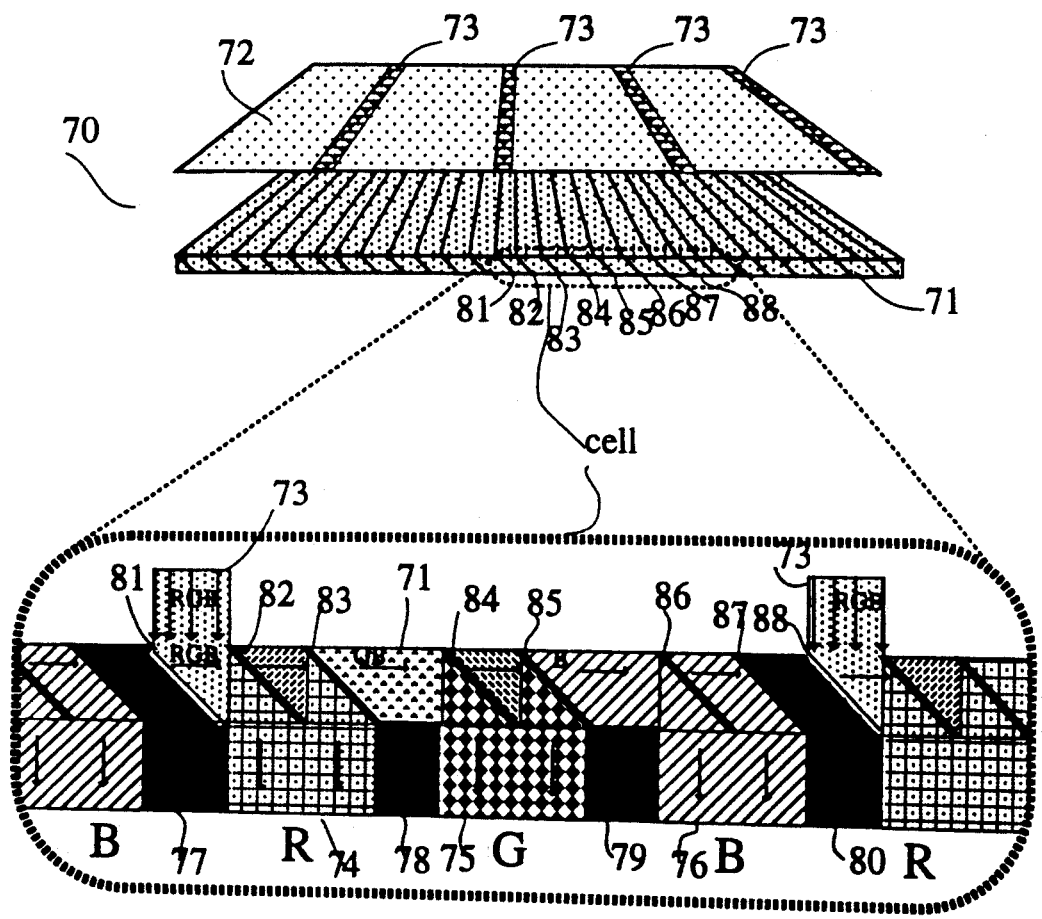
FIG. 5 shows the preferred embodiment of this invention, the polarizing wavelength separating element, PWS.

The distinctions between prior art, FIG. 17, and the preferred embodiment of FIG. 5 are outlined as follows:

1. For each color band, three different layers, the metal 179, the LH CLC 180, and the RH CLC are needed. These layers are not parallel to each other; instead they are at three different angles from each other, 45°, 90°, and 135°, whereas this invention uses metallic layers, LH CLC layers, and retarder layers that are all parallel to each other. The fact that they are all parallel makes possible the realization of the simple fabrication method in FIG. 9 of slicing and stacking to produce thin sheets. On the other hand the prior art configuration is complex, difficult and costly to make, and therefore is limited only to projection LCD. Prior art does not address manufacturability in high volume. Note also that prior art uses left handed and right handed CLC that have to be matched spectrally, and thermally, and are often of different chemical compositions. The present invention teaches how to manufacture, inexpensively, and at high volume. General PWS sheets 140 (FIG. 9) that can be utilized not only in projection, but also in large area flat panel LCD and other applications.

2. Prior art is limited to projection, and specifically, the source 151 can be located only in one position as shown in FIG. 17. The present invention gives flexibility in where to locate the source with respect of the PWS as shown in FIG. 16.

3. Prior art does not teach how to produce high efficiency polarizers that are utilized in the transmissive mode which is crucial in many applications. In the present invention, the PWS can be used as general purpose polarizers in the transmissive mode.

4. No prior art teaches energy recovery mechanisms which recycle instead wasting the unmodulated energy.

5. Prior art does not teach means for eliminating the light losses in direct view LCD associated with the filters and the filling factor.

6. Prior art does not teach means for making large sheets of micro-polarizing filter arrays which produce arrays of beams that are polarized, spectrally separated and spatially separated that can be used in transmissive mode.

Subtractive Color Displays

Figure 18:
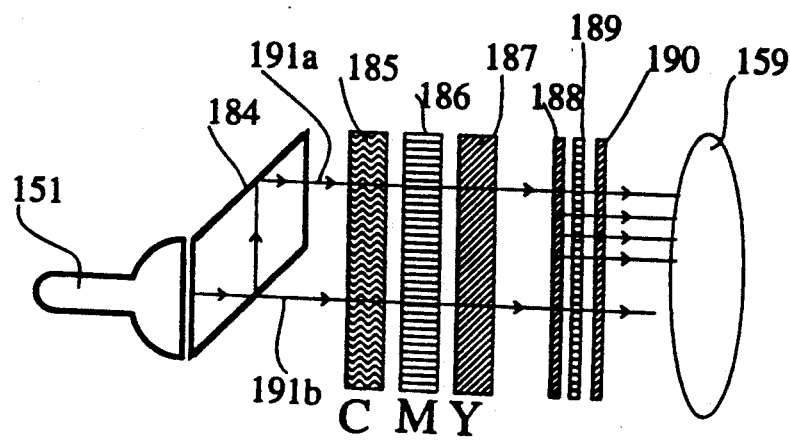
FIG. 18 is an embodiment of the invention that uses the high efficiency polarizers in projection liquid crystal displays that rely on the subtractive primary colors, cyan, magenta, and yellow.
Figure 19:
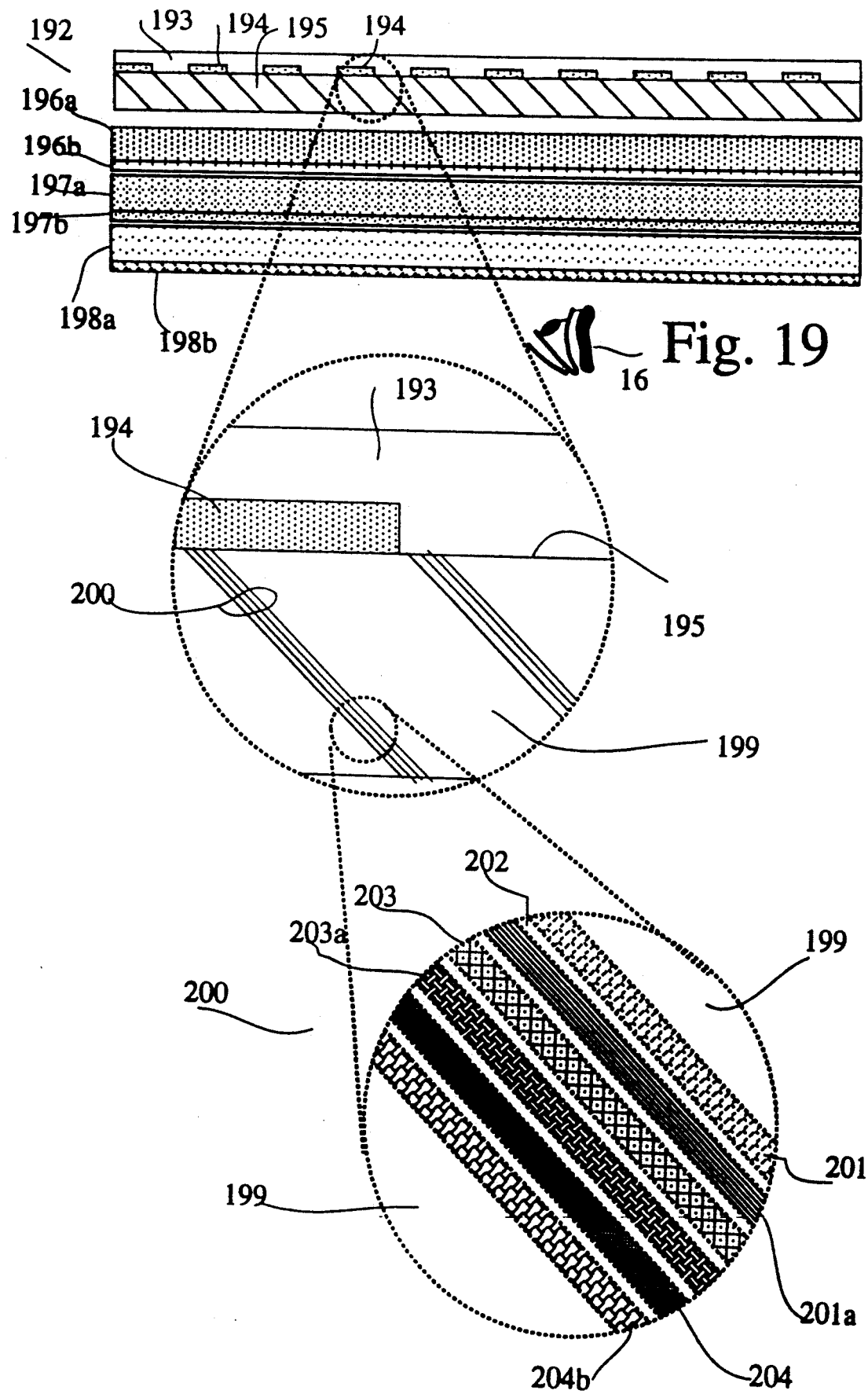
FIG. 19 is an embodiment of the invention that uses the high efficiency PWS element in direct view liquid crystal displays that rely on the subtractive primary colors, cyan, magenta, and yellow.

The color displays described above are based on the mixing additive primary colors red, green and blue. It is also possible to use the subtractive primary colors cyan, magenta, and yellow to produce displays that have some advantages. FIG. 18 is a projection subtractive color LCD system that uses three transmissive LC light valves 185, 186, 187, each designed to rotate the polarization of only one primary color and not affect the polarization of the other two primary colors. Such LC light valves are marketed in the U.S. by In Focus Technology, Inc., and by Kyocera in Japan but use a pair of absorptive polarizer for each LCLV. The embodiment of FIG. 18, uses high efficiency reflective polarizing elements 184, 188, 189, 190 that are located outside the LC light valves. The unpolarized white source 151 is converted into polarized white beams 191a, 191b by the element 184 according the principles described in FIG. 7c. The LCLV 185 rotates the polarization of the red component only such that the red is reflected by the CLC layer 188 and the combination transmit the cyan color (subtracting the red from white). Similarly, the LCLV 186, and CLC layer 189, subtract the green and transmit magenta, and the LCLV 189, and CLC layer 190 subtract the blue, and transmit yellow. Thus color mixing is achieved by the light valves and then the modulated beams are projected with lens 159. This subtractive projection system is much more compact than the those using the additive primary colors FIGS. 12-16. FIG. 19 a illustrates a subtractive color flat panel LCD (direct view) system 192 that utilizes 3 LC panels 196a, 197a, 198a with their CLC polarizers 196b, 197b, 198b each tuned to subtract a primary color. The PWS sheet 194 used in this system functions as a broad-band high efficiency polarizer made of plurality of appropriately tuned CLC layers 200, 201, 202, 203, (FIG. 19) and half-wave retarder layers 201a, 202a, 203a. This PWS 194 is manufactured according to the method of FIG. 9.

What is claimed is:

1. A polarizing wavelength separating optical element, for accepting from a source a linear periodic array of polychromatic optical beams and converting the beams with high conversion efficiency into beams that are circularly polarized, and separated spectrally and spatially in a selected order of wavelengths having a period identical to that of the source comprising a periodic array of cells whose period is identical to the period of the light source, each cell in turn comprising a broadband reflecting layer arranged to reflect source light into and a plurality of subcells in number related to the number of wavelength bands to be separated, said array having an input surface and an output surface which are in parallel planes;

said subcells in turn each comprising a plurality of layers bonded together at an angle to said parallel surface planes of said array, said layers comprising:
(b) a plurality of selectively reflecting cholesteric liquid crystal layers
(c) at least one phase shifting retarder layer; and
(d) a plurality of clear substrates of thickness selected to provide spatial separation between output optical beams.

2. A polarizing wavelength separating optical element according to claim 1, wherein said cell broadband reflecting layer is arranged to provide light to all subcells within the cell, and each subcell within the cell prior to the last subcell is arranged to transmit light at frequencies other than the frequency at which that cell is selectively reflective.

3. A polarizing wavelength separating optical element according to claim 2, wherein said cell broadband reflecting layer is arranged to block light from subcells of an adjacent cell.

4. A polarizing wavelength separating optical element according to claim 1, wherein said selectively reflective cholesteric liquid crystal layers are arranged in sequence by frequency.

5. A polarizing wavelength separating optical element according to claim 1, wherein said selectively reflective cholesteric liquid crystal layers are arranged other than in sequence by frequency.

6. A polarizing wavelength separating optical element according to claim 1, wherein said selectively reflective cholesteric liquid crystal layers are selected for a complete set of colors.

7. A polarizing wavelength separating optical element according to claim 1, wherein said selectively reflective cholesteric liquid crystal layers are responsive to circularly polarized light.

8. A polarizing wavelength separating optical element according to claim 1, wherein said selectively reflective cholesteric liquid crystal layers are responsive to left hand circularly polarized light.

9. A polarizing wavelength separating optical element according to claim 1, wherein said selectively reflective cholesteric liquid crystal layers are responsive to right hand circularly polarized light.

10. A polarizing wavelength separating optical element according to claim 1 wherein said phase shifting retarding layer in said subcell is a quarter-wave retarding film adjacent to the surface of said selectively reflecting cholesteric liquid crystal layers.

11. The method of making a polarizing wavelength separator by the sequency of the; following steps:
1) Stacking a plurality of layers in sets in close proximity, each set comprising at least one broadband reflecting layer, a plurality of cholesteric liquid crystal layers with intervening retarder layers and clear substrate layers;
2) Bonding together the layers in said sets;
3) Stacking said plurality of cells at an angle $\theta$ offset at an edge;
4) Bonding said offset cells;
5) Making slices by cutting said bonded offset cells at $\theta$ to produce a number of polarizing wavelength separator optical elements each having a number of $\theta$ offset cells.

12. The method of making a polarizing wavelength separator according to claim 11, comprising in addition the following step:
6) Polishing the slice.

13. The method of making a polarizing wavelength separator according to claim 11, wherein $$\theta = 45°.$$

14. The method according to claim 11, in which said stacking a plurality of layers in sets in close proximity includes substrate layers of differing thicknesses selected to achieve selected spatial separation.

15. The method according to claim 11, in which the polarizing wavelength separator includes electronics interconnecting a multiplicity of subcells, in which selected layers in said subsets are substrates generally assigned the spacing function without significant requirements of light transmissivity out their cut edges.

16. A direct view primary color multi-pixel display comprising:
a) a periodic linear RGB light source, having a multiplicity of light-emitting surface areas:
b) a polarizing wavelength separator arrayed proximate to said light-emitting surface areas, said polarizing wavelength separator being periodic as a function of the period of said periodic linear light source and serving to accept unpolarized RGB-white light and to separate that unpolarized RGB-white light into polarized R, G and B light bands respectively by selectively reflecting complementary cholesteric liquid crystal semireflector pairs, and a number of non-illuminating bands of selected dimensions separating said R, G and B light bands for each pixel;
c) a transparent electrode layer arrayed proximate to said polarizing wavelength separator;
d) an alignment layer arrayed proximate to said transparent electrode layer;
e) a nematic liquid crystal layer which rotates the polarization of the incident and separated R, G, B light bands when actuated by and electric field; and
means to apply selectively an electric field for each pixel.

17. A projection display for primary color multi-pixel display comprising:
a) a light source;
b) a first polarizing wavelength separator arrayed edgewise proximate to said light source, said polarizing wavelength separator being periodic as a function of its configuration to accept unpolarized RGB-white light and to separate that unpolarized RGB-white light into polarized R, G and B light bands respectively by selectively reflecting complementary cholesteric liquid crystal semireflector pairs for each pixel; and
c) a second polarizing wavelength separator to perform combiner functions for each pixel.

* * * * *